(12) United States Patent
Krakora et al.

(10) Patent No.: US 8,161,510 B2
(45) Date of Patent: Apr. 17, 2012

(54) APPARATUS AND METHOD FOR DATA CACHING TO REDUCE CHANNEL CHANGE DELAY

(75) Inventors: Robert Vincent Krakora, Indianapolis, IN (US); Daniel Richard Schneidewend, Pewaukee, WI (US); Thomas Herbert Jones, Westfield, IN (US)

(73) Assignee: Thomson Licensing, Boulogne Billancourt (FR)

( * ) Notice: Subject to any disclaimer, the term of this patent is extended or adjusted under 35 U.S.C. 154(b) by 1231 days.

(21) Appl. No.: 10/510,535

(22) PCT Filed: Mar. 20, 2003

(86) PCT No.: PCT/US03/08525
§ 371 (c)(1),
(2), (4) Date: Oct. 7, 2004

(87) PCT Pub. No.: WO03/088646
PCT Pub. Date: Oct. 23, 2003

(65) Prior Publication Data
US 2005/0172314 A1    Aug. 4, 2005

Related U.S. Application Data

(60) Provisional application No. 60/370,801, filed on Apr. 8, 2002.

(51) Int. Cl.
*G06F 13/00*        (2006.01)
(52) U.S. Cl. ............................................ 725/38; 725/37
(58) Field of Classification Search .................... 725/37, 725/38
See application file for complete search history.

(56) References Cited

U.S. PATENT DOCUMENTS

| | | | | |
|---|---|---|---|---|
| 5,477,263 A | * | 12/1995 | O'Callaghan et al. | 725/102 |
| 5,594,492 A | | 1/1997 | O'Callaghan et al. | |
| 5,600,378 A | * | 2/1997 | Wasilewski | 348/468 |
| 5,691,986 A | * | 11/1997 | Pearlstein | 370/477 |
| 5,742,361 A | | 4/1998 | Nakase et al. | |
| 5,844,478 A | * | 12/1998 | Blatter et al. | 348/474 |
| 5,959,659 A | * | 9/1999 | Dokic | 725/152 |
| 6,016,172 A | | 1/2000 | Huh | |
| 6,118,498 A | * | 9/2000 | Reitmeier | 348/725 |
| 6,175,595 B1 | | 1/2001 | Keesman | |
| 6,490,001 B1 | * | 12/2002 | Shintani et al. | 348/554 |
| 6,728,965 B1 | * | 4/2004 | Mao | 725/38 |
| 6,804,824 B1 | * | 10/2004 | Potrebic et al. | 725/38 |
| 7,310,807 B2 | * | 12/2007 | Pearson et al. | 725/78 |
| 2001/0033342 A1 | * | 10/2001 | Kim | 348/705 |
| 2002/0044658 A1 | | 4/2002 | Wasilewski et al. | |
| 2002/0083470 A1 | | 6/2002 | Lu | |
| 2002/0087973 A1 | * | 7/2002 | Hamilton et al. | 725/32 |
| 2002/0196939 A1 | * | 12/2002 | Unger et al. | 380/216 |

FOREIGN PATENT DOCUMENTS

JP           09-214651          8/1997
(Continued)

OTHER PUBLICATIONS

Search Report Dated Sep. 12, 2003.

*Primary Examiner* — Pankaj Kumar
*Assistant Examiner* — Sahar Baig
(74) *Attorney, Agent, or Firm* — Robert D. Shedd; Paul P. Kiel

(57) ABSTRACT

An apparatus performs a data caching operation responsive to a channel change event which reduces channel change times. According to an exemplary embodiment, the apparatus includes a cache memory operative to cache an incoming data stream responsive to a channel change command. A processor is operative to find program specific information included within the incoming data stream. A decoder is operative to decode the cached data stream responsive to the processor finding the program specific information.

20 Claims, 3 Drawing Sheets

FOREIGN PATENT DOCUMENTS

| | | |
|---|---|---|
| JP | 10-190617 | 7/1998 |
| JP | 11-98098 | 4/1999 |
| JP | 2000-505988 | 5/2000 |
| WO | WO98/30023 | 7/1998 |
| WO | WO 99/09741 | 2/1999 |
| WO | WO 00/57646 | 9/2000 |
| WO | WO 02/100109 | 12/2002 |

* cited by examiner

APPARATUS AND METHOD FOR DATA CACHING TO REDUCE CHANNEL CHANGE DELAY

This application claims the benefit, under 35 U.S.C. §365 of International Application PCT/US03/08525, filed Mar. 20, 2003, which was published in accordance with PCT Article 21(2) on Oct. 23, 2003 in English and which claims the benefit of U.S. provisional patent application No. 60/370,801, filed Apr. 8, 2002.

The present invention generally relates to digital communications, and more particularly, to a technique for processing data in a digital communication apparatus so as to reduce channel change times.

Conventional television receivers, such as analog television signal receivers conforming to the National Television Standards Committee (NTSC) protocols, typically provide rapid channel change capabilities. In particular, such receivers effectuate a channel change by changing a tuner frequency (i.e. tuning), and acquiring a television signal modulated onto the tuner frequency (i.e., synchronizing). With such receivers, the predominant time delay in a channel change operation is the time required to change the tuner frequency. Acquiring picture synchronization is extremely rapid, since horizontal and vertical synchronization information occurs frequently (i.e., 63 microseconds and 33 milliseconds, respectively) in an NTSC television signal.

Recently, digital communication receivers such as digital television signal receivers conforming to the Advanced Television Standards Committee (ATSC) protocols and other digital devices have become increasingly popular. Unfortunately, changing channels with such digital devices may be a much slower process than the NTSC process described above. One potential cause for such slower channel change times in the digital domain involves the processing of data such as audio and/or video data conforming to any of the Moving Picture Experts Group (MPEG) protocols, or other processing and/or compression protocols which may be known in the art. For example, in order to effectuate a channel change with an apparatus such as a digital television signal receiver, the receiver must wait to receive Program Specific Information (PSI) data structures via the MPEG transport stream, extract the appropriate audio and/or video Program Identifiers (PIDs) from the PSI data structures, and then configure the transport, and audio and/or video decoder circuitry accordingly. Typically, decoders must wait until they identify the proper start sequence data before decoding can begin. As a result of these steps, channel change times can become noticeably protracted, which may be unacceptable to many users. This is especially problematic in systems that require the receiver to acquire the appropriate PSI data structures from the data stream upon each channel change. Accordingly, there is a need for a technique for reducing the time necessary to effectuate a channel change operation in digital communication apparatuses.

In accordance with an aspect of the present invention, a method for reducing channel change times is disclosed. According to an exemplary embodiment, the method comprises steps of receiving a channel change command, caching an incoming data stream responsive to the channel change command, finding program specific information (PSI) included within the incoming data stream, and transferring the cached data stream for decoding responsive to the finding of the program specific information. Such a method can advantageously shorten the channel change period when the program specific information occurs immediately after the channel change command is received because the system has relatively rapid access to such data when the cached data stream is transferred to the transport and decoders, rather than being forced to wait for the next occurrence of the information.

In accordance with another aspect of the present invention, a digital communication apparatus is disclosed. According to an exemplary embodiment, the apparatus comprises memory means for caching an incoming data stream responsive to a channel change command. Processing means is provided for finding program specific information (PSI) included within the incoming data stream. Decoding means decodes the cached data stream responsive to the processing means finding the program specific information.

The above-mentioned and other features and advantages of this invention, and the manner of attaining them, will become more apparent and the invention will be better understood by reference to the following description of embodiments of the invention taken in conjunction with the accompanying drawings, wherein.

The exemplifications set out herein illustrate preferred embodiments of the invention, and such exemplifications are not to be construed as limiting the scope of the invention in any manner.

Figure 1:
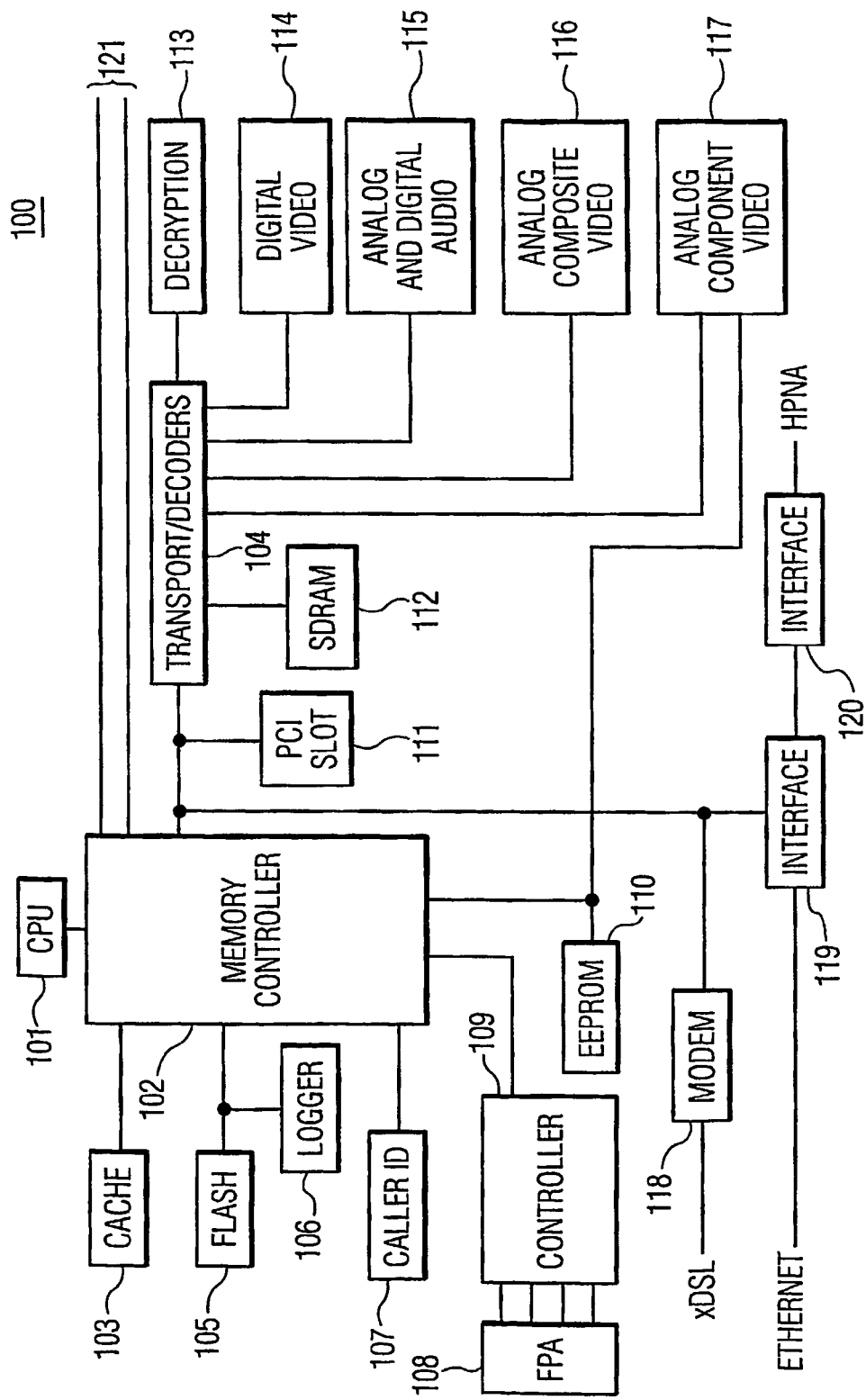
FIG. 1 is a block diagram of an exemplary apparatus suitable for implementing the present invention.

Referring now to the drawings, and more particularly to FIG. 1, a block diagram of an exemplary apparatus 100 suitable for implementing the present invention is shown. For purposes of example and explanation, apparatus 100 is shown as a Digital Subscriber Line (DSL) set-top box. However, it will be understood by those skilled in the art that principles of the present invention may be applied to many other apparatuses. The elements of apparatus 100 are generally known to those skilled in the art and will be described to the extent necessary to understand the present invention.

As indicated in FIG. 1, apparatus 100 comprises a central processing unit (CPU) 101, a memory controller 102, a cache memory 103, a transport/decoders block 104, a flash memory 105, a logger 106, a caller identification (ID) module 107, a front panel assembly (FPA) 108, a controller 109, an electrically erasable programmable read only memory (EEPROM) 110, a peripheral control interface (PCI) slot 111, a synchronous dynamic random access memory (SDRAM) 112, a decryption block 113, a digital video block 114, an analog and digital audio block 115, an analog composite video block 116, an analog component video block 117, a modem 118, interfaces 119 and 120, and output lines 121. The foregoing elements of FIG. 1 are operatively coupled as indicated by the data lines shown in FIG. 1. Note that no directional arrows are shown in FIG. 1 as it is intended that all data lines may be bi-directional. Apparatus 100 may also include other elements, such as clock generators, power supplies, etc. which are not shown in FIG. 1 for clarity of description.

CPU 101 is operative to control various functions of apparatus 100 including various functions associated with the present invention, which will described later herein. CPU 101 may for example be embodied as an integrated circuit (IC), such as an NEC model VR5432. Memory controller 102 is operative to control the storage and retrieval of data in apparatus 100, and may for example be embodied as an IC such as NEC model VRC5477. The operation of memory controller 102 may appear transparent with respect to data transfer. Accordingly, various elements of apparatus 100 may communicate with one another through memory controller 102.

Cache memory 103 is operative to store data, including an incoming data stream in accordance with principles of the present invention, as will discussed later herein. Cache memory 103 may, for example, be embodied as an SDRAM or other memory device having 64 megabytes or more of storage capacity. Transport/decoders block 104 comprises a transport (e.g., demultiplexer), an audio decoder, a video decoder, one or more application decoders, and an NTSC encoder. According to an exemplary embodiment, the video decoder is operative to perform MPEG-1 and/or MPEG-2 decoding upon a video data stream, and the audio decoder is operative to perform AC-3 audio decoding upon an audio data stream. Of course, other types of audio and/or video decoding techniques may be provided. Transport/decoders block 104 may for example be embodied as an IC such as a BCM7021 model.

Flash memory 105 is operative to store data during operation of apparatus 100, and may for example include 8 megabytes or more of storage capacity. Logger 106 is operative to collect data during operation of apparatus 100 for purposes of debugging any software errors. Caller ID module 107 is operative to perform a caller ID function for apparatus 100. FPA 108 is operative to receive user inputs, such as via a hand-held remote control, keyboard, or other input device. Controller 109 is operative to receive outputs from FPA 108 and perform various control functions of apparatus 100. EEPROM 110 is operative to store data in a non-volatile manner, such as analog video component data used conversion purposes. PCI slot 111 is operative to accommodate insertion of a PCI device. SDRAM 112 is operative to store data, including filtered portions of an incoming data stream, as will be discussed later herein. SDRAM 112 may for example include 16 megabytes or more of storage capacity. SDRAM 112 and cache memory 103 may be included within the same memory device or IC. Decryption block 113 provides one or more data decryption functions for apparatus 100.

Digital video block 114 is operative to process and output digital video data. Analog and digital audio block 115 is operative to process and output analog and digital audio data. Analog composite video block 116 is operative to process and output analog composite data. Analog component video block 117 is operative to process and output analog component video data. Modem 118 is operative to perform a modulation/demodulation function, and according to an exemplary embodiment is an xDSL modem (where x represents any version of DSL). Interface 119 is operative to receive an incoming data stream provided via an Ethernet network, and may for example be embodied as an IC such as a BCM4413 model. Interface 120 is operative to receive an incoming data stream provided via a home telephone network (HPNA), and may for example be embodied as an IC such as a BCM4100 model. Although not expressly shown in FIG. 1, apparatus 100 may be adapted to receive data from other types of wired and/or wireless networks, such as satellite, internet, cable or other networks. Output lines 121 are operative to provide outputs from apparatus 100 to one or more external devices, such as a printer or other device. Each output line 121 may for example be embodied as a universal serial bus (USB).

Figure 2:
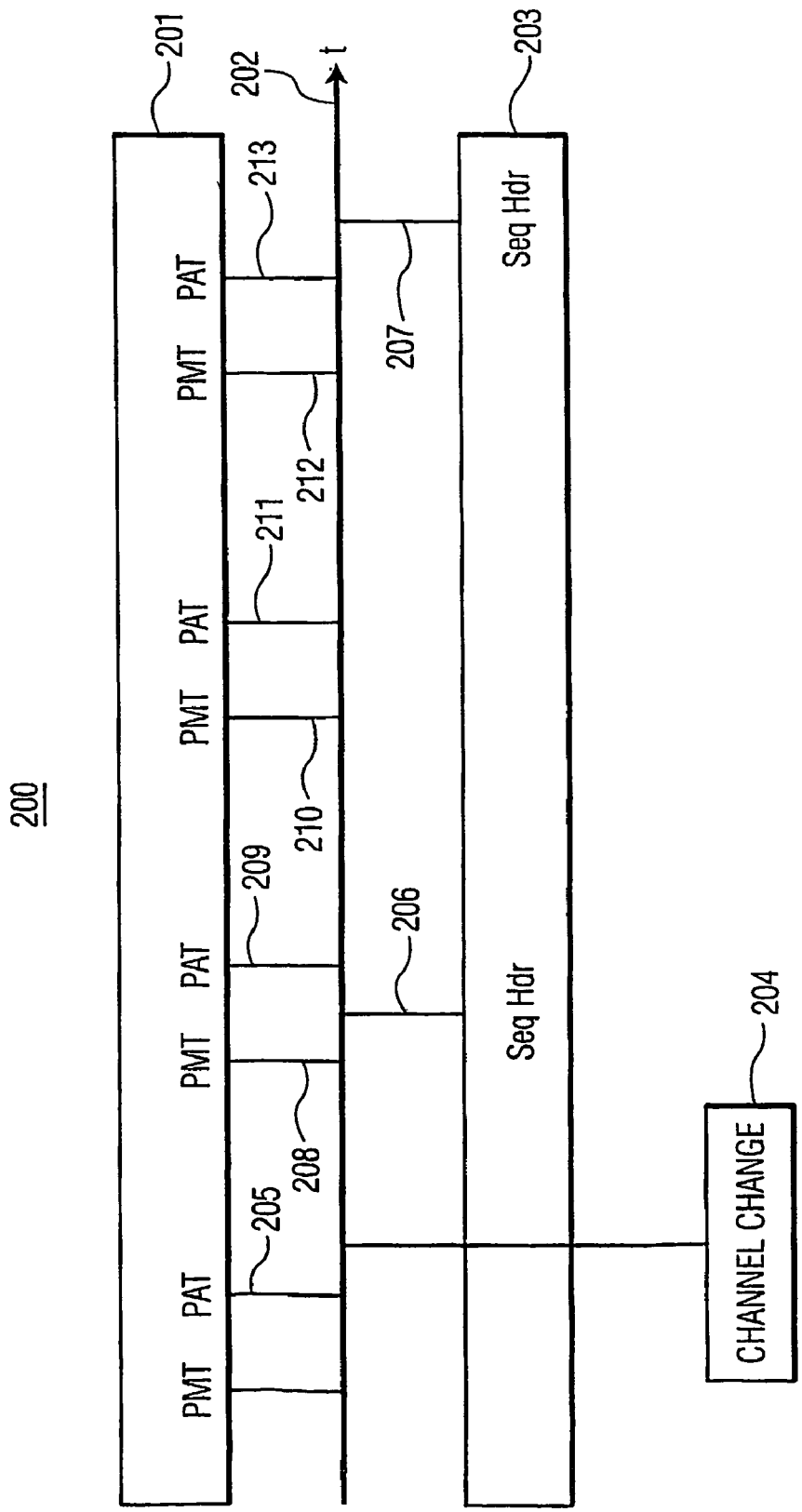
FIG. 2 is an exemplary diagram illustrating the data stream and the various elements included therein, which is useful for understanding principles of the present invention.

Referring to FIG. 2, an exemplary diagram 200 useful for understanding principles of the present invention is provided. In particular, FIG. 2 illustrates an exemplary relationship between Program Specific Information (PSI) (i.e., Program Association Table (PAT) data, Program Map Table (PMT) data) and sequence headers within an incoming data stream during a channel change operation.

As indicated in FIG. 2, PSI block 201 comprises PAT data and PMT data, both of which are generally known in the art and occur periodically within an incoming data stream. Time line 202 shows the passage of time in FIG. 2, and thereby indicates the sequence of incoming data flow. Sequence header block 203 comprises sequence header data, such as MPEG video and/or audio sequence headers, which also occur periodically within an incoming data stream. Channel change block 204 represents a channel change event. Although blocks 201 and 203 are shown in FIG. 2 as continuous blocks for convenience, it should be understood that PAT data, PMT data, and sequence header data occur as separate blocks within the data stream. According to an exemplary embodiment, PAT data and PMT data occur at a frequency of about 200 milliseconds, and the sequence header data occurs at a frequency of about 500 milliseconds. This timing, however, may vary depending upon the particular encoder that generates the data stream.

Sequentially, an apparatus must first find the PAT data, and then find the PMT data, which provides the audio and/or video Program Identifiers (PIDs) corresponding to a selected channel. Decoders using the audio and/or video PIDs must then find the sequence headers to begin a buffering and decoding operation. The presentation of the video/audio output begins following the acquisition and processing of the sequence header. In the example sequence shown in FIG. 2, the channel change event indicated by block 204 occurs immediately after the occurrence of PAT data 205 in the data stream. As a result, a conventional apparatus must wait for the next occurrences of PAT data and PMT data in the data stream to determine the desired PIDs and before the decoders begin looking for sequence headers. However, as indicated in FIG. 2, a sequence header 206 (i.e., the first occurrence in block 203) occurs before the next PAT data 209. Accordingly, a conventional apparatus must wait for the next sequence header 207 (i.e., the second occurrence in block 203) before decoding can begin. Consequently, the channel change time becomes protracted, which may be unacceptable to many users.

However, according to the present invention, apparatus 100 of FIG. 1 begins a data caching operation immediately after a channel change event which enables channel change times to be reduced. In FIG. 2 for example, the incoming data stream to apparatus 100 is cached responsive to the channel change event of block 204. This caching operation enables incoming sequence header data 206 (i.e., the first occurrence in block 203) to be cached so that it may be rapidly found after PAT data and PMT data is captured and processed. In this case, as soon as the PMT and PAT are acquired and the PID derived therefrom, the apparatus processes the cached data to find the most recent sequence block after the channel change command. Accordingly, apparatus 100 does not have to wait for the next sequence header data (i.e., the second occurrence in block 203), but rather can rapidly inject the cached sequence header data into the decoders of block 104 so that decoding can quickly begin. As a result, channel change times are advantageously reduced.

Figure 3:
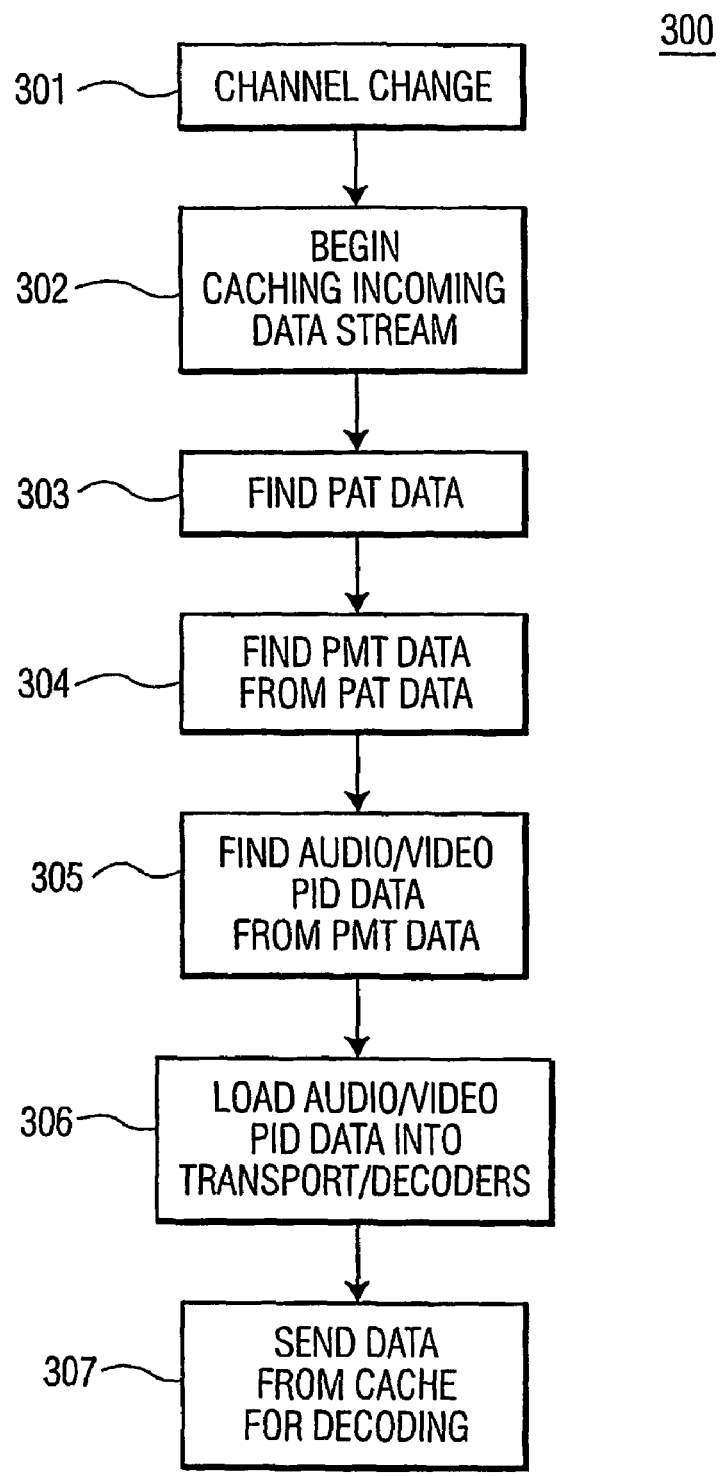
FIG. 3 is a flowchart illustrating steps according to exemplary embodiments of the present invention.

Referring now to FIG. 3, a flowchart 300 illustrating steps according to exemplary embodiments of the present invention is shown. For purpose of example and explanation, the steps of FIG. 3 will be described with reference to apparatus 100 of FIG. 1. Accordingly, the steps of FIG. 3 are merely exemplary, and are not intended to limit the present invention in any manner.

At step 301, a user inputs a channel change command to apparatus 100 via an input device such as a hand-held remote control, keyboard, or the like. FPA 108 receives the channel change command and outputs a corresponding signal indicative of the command to controller 109. In response thereto, controller 109 outputs a control signal indicative of the channel change command to CPU 101 via memory controller 102. In this manner, CPU 101 detects the channel change command.

At step 302, a data caching operation begins. According to an exemplary embodiment, CPU 101 outputs a control signal responsive to the control signal from controller 109, which in turn causes cache memory 103 to begin storing (i.e., caching) the incoming data stream in response to the channel change command. As previously indicated herein, the incoming data stream may be provided to apparatus 100 via a wired or wireless network, such as a DSL, Ethernet, satellite, cable, telephone or other network including the internet or a local area network (LAN).

At step 303, PAT data within the incoming data stream is found. According to an exemplary embodiment, CPU 101 also outputs a control signal (in response to the control signal from controller 109) which causes the transport of block 104 to filter the incoming data stream and thereby selectively store PAT data within the incoming data stream in SDRAM 112. That is, since PAT data typically includes fixed identification data (e.g., a fixed header value), the transport of block 104 can demultiplex PAT data from the incoming data stream. After PAT data is extracted from the incoming data stream and stored in SDRAM 112, transport/decoders block 104 generates a control signal (e.g., interrupt). CPU 101 detects this control signal and responds by outputting another control signal which causes the PAT data within SDRAM 112 to be retrieved.

Next, at step 304, the retrieved PAT data is used to find PMT data. According to one exemplary embodiment, CPU 101 searches the retrieved PAT data to find identification data (e.g., a header value) for PMT data. CPU 101 then outputs a control signal including the PMT identification data, which causes the transport of block 104 to filter the incoming data stream and thereby selectively store PMT data within the incoming data stream in SDRAM 112. That is, the transport of block 104 demultiplexes PMT data from the incoming data stream based on the PMT identification data, and causes the extracted PMT data to be stored in SDRAM 112. After the PMT data is stored in SDRAM 112, transport/decoders block 104 generates a control signal (e.g., interrupt). CPU 101 detects this control signal and responds by outputting another control signal which causes the PMT data within SDRAM 112 to be retrieved.

According to another exemplary embodiment, step 304 may be performed by filtering PMT data from data stored in cache memory 103. With this embodiment, CPU 101 also searches the PAT data found at step 303 to find identification data (e.g., a header value) for PMT data, and outputs a control signal including the PMT identification data, which causes the transport of block 104 to filter data for storage in SDRAM 112. However, with this embodiment, CPU 101 outputs a control signal which causes the data stored in cache memory 103 to be output and transferred through the transport of block 104 so as to filter out the PMT data contained therein for storage in SDRAM 112. That is, the transport of block 104 demultiplexes PMT data from the data transferred from cache memory 103, and causes the extracted PMT data to be stored in SDRAM 112. After the PMT data is stored in SDRAM 112, transport/decoders block 104 generates a control signal (e.g., interrupt). CPU 101 detects this control signal and responds by outputting another control signal, which causes the PMT data within SDRAM 112 to be retrieved.

This latter embodiment of step 304 has at least two different variations. According to one variation of this embodiment, CPU 101 is programmed to always use the data in cache memory 103 to obtain PMT data. According to another variation of this embodiment, CPU 101 is programmed to use either the data in cache memory 103 or data in the incoming data stream to find PMT data. According to this latter variation, CPU 101 uses the data in cache memory 103 to find PMT data when the process of finding PAT data at step 303 exceeds a predetermined time period, and otherwise uses data in the incoming data stream. For example, CPU 101 may begin a timer (or take a snap shot of one that is already running) when its search for PAT data begins at step 303. CPU 101 then checks this timer after PAT data is retrieved. If the timer exceeds a predetermined time period (e.g., 200 milliseconds), CPU 101 uses the data in cache memory 103 to find PMT data. Alternatively, if the timer does not exceed the predetermined time period, CPU 101 uses data in the incoming data stream to find PMT data.

According to all embodiments of step 304 described above, CPU 101 finds PMT data from PAT data. Moreover, the PMT data may be obtained from the incoming data stream, or alternatively from the data stored in cache memory 103.

At step 305, the retrieved PMT data is used to find audio and/or video PID data associated with the desired audio and/or video packets associated with the channel change command of step 301. According to an exemplary embodiment, CPU 101 searches the retrieved PMT data to find audio and/or video PID data for the program selected via the channel change command of step 301.

At step 306, the audio and/or video PID data is loaded into transport/decoders block 104. According to an exemplary embodiment, CPU 101 transfers the applicable audio and/or video PID data to transport/decoders block 104 which configures itself accordingly. That is, block 104 adapts to filter and decode those portions of the incoming data stream corresponding to the audio and/or video PID data. Once the audio and/or video PID data is loaded into transport/decoders block 104, the audio and/or video decoders of block 104 begin looking for audio and/or video sequence headers.

Then, at step 307, after the PID data has been identified and loaded into the transport/decoder block, the data stored in cache memory 103 is sent to the decoders of block 104 for decoding. According to an exemplary embodiment, CPU 101 outputs a control signal which causes cache memory 103 to transfer the data cached therein to the decoders of block 104 where the sequence header data is found and data decoding is performed. Of course, decoding continues on the incoming data stream after the cached data is decoded.

As described herein, the present invention enables incoming sequence header data to be cached so that it may be rapidly found after PAT data and PMT data is captured and processed. Accordingly, decoding can quickly begin and channel change times are advantageously reduced. The present invention is particularly applicable to various apparatuses, either with or without a display device. Accordingly, the principles described herein are applicable to various types of devices or apparatuses including, but not limited to, television sets, computers, monitors, hand-held devices, etc. that include a display device, and devices or apparatuses such as video cassette recorders (VCRs), digital versatile disk (DVD) players, computers, video game boxes, personal video recorders (PVRs) or other apparatuses that may not include a display device.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method for reducing channel change times, comprising:
   receiving a channel change command;
   immediately initiating caching of an incoming data stream associated with a newly selected channel in response to the channel change command, the cached data stream including packets including decoder synchronization data, and having an associated packet identifier;

finding program specific information included within the incoming data stream, and determining the packet identifier associated with the packets having decoder synchronization data from therein;

finding a first instance of decoder synchronization data, using the determined packet identifier, within the cached data stream including decoder synchronization data received before the program specific information found in the incoming data stream; and decoding the incoming data stream associated with the newly selected channel in response to the first instance of decoder synchronization data.

2. The method of claim 1, wherein the program specific information comprises program association table data and program map table data.

3. The method of claim 1, wherein the step of finding the program specific information includes filtering data from the cached data stream.

4. The method of claim 3, wherein the data filtered from the cached data stream comprises program map table data.

5. The method of claim 1, wherein the decoder synchronization data corresponds to sequence headers according to the MPEG standards.

6. The method of claim 1, wherein the step of finding the program specific information comprises:

finding program association table data within the incoming data stream;

finding program map table data using the program association table data; and finding at least one of video program identification data and audio program identification data using the program map table data.

7. An apparatus, comprising:

memory means for immediately initiating caching an incoming data stream associated with a newly selected channel responsive to a channel change command, the cached data stream including packets including decoder synchronization data, and having an associated packet identifier;

processing means for finding program specific information included within the incoming data stream, determining the packet identifier associated with the packets of decoder synchronization data, and finding a first instance of decoder synchronization data, using the determined packet identifier, in the cached data stream including decoder synchronization data received before the program specific information; and decoding means for decoding the cached data stream responsive to the first instance of decoder synchronization data.

8. The apparatus of claim 7, wherein the program specific information comprises program association table data and program map table data.

9. The apparatus of claim 7, further comprising transport means for filtering data, and wherein the processing means finds the program specific information by filtering data from the cached data stream via the transport means.

10. The apparatus of claim 9, wherein the data filtered from the cached data stream by the transport means comprises program map table data.

11. The apparatus of claim 7, wherein the decoder synchronization data corresponds to sequence headers according to the MPEG standards.

12. The apparatus of claim 7, wherein the processing means finds the program specific information by finding program association table data within the incoming data stream, finding program map table data using the program association table data, and finding at least one of video program identification data and audio program identification data using the program map table data.

13. The apparatus of claim 7, wherein the apparatus is a set-top box.

14. A digital communication apparatus having reduced channel change times, comprising:

means for receiving a data stream;

means for receiving a channel change command;

a cache memory operative to initiate storing of a portion of the data stream including packets including decoder synchronization data, and having an associated packet identifier in response to the channel change command;

a decoder operative to process the decoder synchronization data and to decode the data stream;

a processor, coupled to the receiving means, the cache memory, and the decoder, for immediately causing, in response to receipt of the channel change command, the portion of the data stream that follows the receipt including program specific information to be stored in the cache memory, for identifying the program specific information in response to the channel change command, and determining the associated packet identifier for packets having decoder synchronization data from therein, for identifying a first instance of decoder synchronization data, using the determined associated packet identifier, in the cache memory including decoder synchronization data received before the program specific information, and for causing the portion of the data stream stored in the cache memory to the processed by the decoder in response to the first instance of decoder synchronization.

15. The digital communication apparatus of claim 14, wherein the program specific information comprises program association table data and program map table data.

16. The digital communication apparatus of claim 14, further comprising a transport operative to filter data, and wherein the processor is operative to find the program specific information by filtering data from the cached data stream via the transport.

17. The digital communication apparatus of claim 16, wherein the data filtered from the cached data stream by the transport comprises program map table data.

18. The digital communication apparatus of claim 14, wherein the decoder synchronization data corresponds to sequence headers according to the MPEG standards.

19. The digital communication apparatus of claim 14, wherein the processor is operative to find the program specific information by finding program association table data within the incoming data stream, finding program map table data using the program association table data, and finding at least one of video program identification data and audio program identification data using the program map table data.

20. The digital communication apparatus of claim 14, wherein the apparatus is a digital subscriber line set-top box.

* * * * *